United States Patent
Kuo et al.

(10) Patent No.: US 8,654,353 B2
(45) Date of Patent: Feb. 18, 2014

(54) MEASURING METHOD FOR TOPOGRAPHY OF MOVING SPECIMEN AND A MEASURING APPARATUS THEREOF

(75) Inventors: Shih-Hsuan Kuo, Hsinchu County (TW); Wei-Cheng Wang, Kaohsiung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 250 days.

(21) Appl. No.: 13/088,069

(22) Filed: Apr. 15, 2011

(65) Prior Publication Data
US 2012/0170052 A1 Jul. 5, 2012

(30) Foreign Application Priority Data
Dec. 30, 2010 (TW) ................. 99146801 A

(51) Int. Cl.
*G01B 11/30* (2006.01)
*G01B 11/28* (2006.01)
*G01B 11/14* (2006.01)

(52) U.S. Cl.
USPC ............................ 356/602; 356/614; 356/630

(58) Field of Classification Search
USPC ............. 356/237.1–241.6, 242.1–243.8, 356/426–431, 600–640
See application file for complete search history.

(56) References Cited

U.S. PATENT DOCUMENTS

| | | | |
|---|---|---|---|
| 3,902,363 A | 9/1975 | Ishimoto | |
| 3,979,935 A | 9/1976 | Edwards et al. | |
| 4,047,036 A | 9/1977 | Smith et al. | |
| 4,121,292 A | 10/1978 | Galanis et al. | |
| 4,134,211 A | 1/1979 | Typpo et al. | |
| 4,146,327 A | 3/1979 | Harris | |
| 4,276,699 A | 7/1981 | Sterki et al. | |
| 4,408,884 A | 10/1983 | Kleinknecht et al. | |
| 4,464,840 A | 8/1984 | Newland | |
| 4,473,953 A | 10/1984 | Sauvage | |
| 4,500,203 A | 2/1985 | Bieringer | |
| 4,720,808 A * | 1/1988 | Repsch | 702/175 |
| 4,741,109 A * | 5/1988 | McCurdy et al. | 33/501.03 |

(Continued)

FOREIGN PATENT DOCUMENTS

| | | |
|---|---|---|
| CN | 1257207 A | 6/2000 |
| CN | 1457426 A | 11/2003 |
| JP | 2010014549 A | 1/2010 |

OTHER PUBLICATIONS

Jeng et al., On-Line Layer Profile Dimensions Measurement of Model Maker Rapid Protoyping Using Fision Technology, International Journal of Advanced Manufacturing Technology, 2001, pp. 125-133, vol. 17 Issue 2.

(Continued)

*Primary Examiner* — Gregory J Toatley
*Assistant Examiner* — Jarreas C Underwood
(74) *Attorney, Agent, or Firm* — Morris Manning & Martin LLP; Tim Tingkang Xia, Esq.

(57) ABSTRACT

A measuring method for topography of moving specimen and a measuring apparatus thereof is disclosed, providing a measuring module that moves along with a testing specimen to narrow relative velocity of the testing specimen and the measuring module so that the measuring module is able to have enough luminous intensity signal at the same position in time, to measure the topography or the thickness of the testing specimen.

26 Claims, 14 Drawing Sheets

(56) References Cited

U.S. PATENT DOCUMENTS

| | | | |
|---|---|---|---|
| 4,882,498 A * | 11/1989 | Cochran et al. | 250/559.04 |
| 4,958,930 A * | 9/1990 | Robertson, Jr. | 356/504 |
| 5,021,666 A | 6/1991 | Reber | |
| 5,056,922 A * | 10/1991 | Cielo et al. | 356/604 |
| 5,077,908 A | 1/1992 | Moore | |
| 5,117,081 A | 5/1992 | Bagdal | |
| 5,204,889 A | 4/1993 | Kraybill | |
| 5,365,084 A * | 11/1994 | Cochran et al. | 250/559.02 |
| 5,581,353 A * | 12/1996 | Taylor | 356/631 |
| 5,609,718 A | 3/1997 | Meikle | |
| 5,644,512 A | 7/1997 | Chernoff et al. | |
| 5,801,066 A | 9/1998 | Meikle | |
| 5,825,670 A | 10/1998 | Chernoff et al. | |
| 5,850,287 A | 12/1998 | Sorin et al. | |
| 5,945,595 A | 8/1999 | Mori et al. | |
| 6,047,479 A | 4/2000 | Galestien | |
| 6,147,758 A | 11/2000 | Okabe et al. | |
| 6,288,538 B1 | 9/2001 | Aruga et al. | |
| 6,430,832 B1 | 8/2002 | Dall'Aglio et al. | |
| 6,590,221 B2 * | 7/2003 | Ha et al. | 250/559.27 |
| 6,618,954 B2 | 9/2003 | Kumazawa et al. | |
| 6,637,123 B2 | 10/2003 | Rucha et al. | |
| 6,643,943 B2 | 11/2003 | Dall'Aglio et al. | |
| 6,775,011 B2 | 8/2004 | Gagliano | |
| 6,793,865 B2 | 9/2004 | Kapteyn et al. | |
| 6,806,459 B1 | 10/2004 | Ringlien et al. | |
| 6,848,190 B2 | 2/2005 | Dall'Aglio et al. | |
| 6,873,423 B2 | 3/2005 | Huang | |
| 6,920,235 B2 * | 7/2005 | Biazzi | 382/111 |
| 7,024,785 B2 | 4/2006 | Dall'Aglio et al. | |
| 7,131,211 B2 | 11/2006 | Kirstine | |
| 7,155,356 B2 * | 12/2006 | Mantyla et al. | 702/76 |
| 7,199,884 B2 * | 4/2007 | Jasinski et al. | 356/632 |
| 7,325,324 B2 | 2/2008 | Dall'Aglio et al. | |
| 7,328,517 B2 | 2/2008 | Kirstine | |
| 7,411,685 B2 | 8/2008 | Takashima et al. | |
| 7,464,482 B2 | 12/2008 | Dall'Aglio et al. | |
| 7,605,929 B2 | 10/2009 | Erfling et al. | |
| 7,690,127 B2 | 4/2010 | Dall'Aglio et al. | |
| 7,847,943 B2 * | 12/2010 | Hellstrom et al. | 356/430 |

OTHER PUBLICATIONS

Woong et al., Phase-contrast microscoy by in-line phase-shifting digital holography: shape measurement of a titanium pattern with nanometer axial resolution, 2007, Opt.Eng., vol. 469(4).

Enguita et al., Common-path two-wavelength interferometer with submicron precision for profile measurements in on-line applications, Optical Engineering, 2010, vol. 49 Issue:2.

Alvarez, On-Line submicron profile measurements from safe distances with conoscopic holography:feasibility and potential problems, Optical Engineering, 2008, vol. 47 Issue:2.

Wu, Method for Inspecting Fire-Resistant Steel-Cable Conveyor Belt in Coal Mining, Henan Chemical Industry, 2010, p. 45-46, vol. 27, No. 10.

* cited by examiner

MEASURING METHOD FOR TOPOGRAPHY OF MOVING SPECIMEN AND A MEASURING APPARATUS THEREOF

CROSS-REFERENCE TO RELATED APPLICATION

This non-provisional application claims priority under 35 U.S.C. §119(a) on Patent Application No. 099146801 filed in Taiwan, R.O.C. on Dec. 30, 2010, the entire contents of which are hereby incorporated by reference.

TECHNICAL FIELD

The present disclosure relates to a method and an apparatus for measuring the topography of a moving specimen.

TECHNICAL BACKGROUND

Nowadays, continuous manufacturing processes, such as a roll-to-roll manufacturing process, has been vastly applied in various industries including flat panel display industry, flexible electronic industry and solar cell industry, etc., owing to their advantageous characteristics of being able to produce a mass of products in a comparatively short period of time.

However, in those rapid mass production processes, it is possible to have a plenty of defective products being produced if a decision can not be made immediately for shutting down the production processes in the case of an abnormality. Thus, it is common for those rapid mass production processes to have certain monitoring devices or measuring devices installed therein so as to be used for detecting any abnormality in time, and therefore, adjusting the manufacturing parameters of the corresponding mass production process accordingly, or even shutting down the whole process for major revisions.

There are already many monitoring/measuring apparatuses available for monitoring surface structure, film thickness or surface roughness of a product so as to prevent the surface of the product from being scratched. It is common to design those conventional monitoring/measuring apparatuses as non-contact measuring modules, whereas some of those non-contact measuring modules can be optical measuring apparatuses, such as those disclosed in U.S. Pat. Nos. 7,605,929, 7,411,685, 6,806,459, 6,775,011. It is noted that the optical measuring apparatuses disclosed in U.S. Pat. Nos. 7,605,929 and 7,411,685 are designed to be movable while allowing the corresponding device-under-test (DUT) to be stationary during being measured, but on the contrary that the optical measuring apparatuses disclosed in U.S. Pat. Nos. 6,806,459 and 6,775,011 are stationary while enabling the DUT to move during the measuring.

For measuring DUTs with high surface reflectivity, the sampling frequency of the measuring apparatus can be increased for increasing the lateral resolution. On the other hand, for DUTs with low surface reflectivity, it may unable to obtain the required lateral resolution simply by increasing the sampling frequency of the measuring apparatus, since the increasing of sampling frequency may cause the exposure of each and every location of signal acquisition to be not sufficient, resulting that the measuring apparatus may unable to acquire complete location signals.

It is noted that, for any optical measurement, sufficient exposure time is the key element for acquiring surface signals of a product to be measured. Accordingly, while performing an optical measurement in a rapid continuous manufacturing process where the products to be measured are being transported at high speed, it is likely that the optical measurement will not be able to acquire sufficient luminous intensity signal at the same position in time when the products are objects with low reflectivity, such as optical films. Thus, the stationary optical measuring apparatuses may incapable of being used to acquire sufficient luminous intensity signal at the same position in time for products that are being transported at high speed.

On the other hand, although some optical measuring apparatuses are designed to be movable, they are restricted for measuring products that are stationary and thus may not be used for measuring products that are being transported at high speed.

SUMMARY

The present disclosure is to provide a method and apparatus for measuring the topography of moving specimens, operationally that the relative velocity between a fast moving specimen and a measuring module is reduced for enabling the measuring module to acquire sufficient luminous intensity signal at the same position in time trying to avoid being adversely affected by ambient environment or other irresistible factors, and thereby, to measure the topography or the thickness of the testing specimen based upon optical measurement principles including chromatic confocal principle and/or laser triangulation principle.

One of the embodiments of the present disclosure provides an apparatus for measuring the topography of moving specimens, which is adapted to be applied to a transportation system, comprising a control unit; a control module of linear movement, electrically connecting to the control unit; at least one first linear movement device, each disposed above the transportation system while being electrically connected to the control module of linear movement; a first measurement control module, electrically connecting to the control unit; and at least one first measuring module, each being mounted at the corresponding first linear movement device while being enabled to optically connect to the first measurement control module for optical transmission.

One of the embodiments of the present disclosure provides a method for measuring the topography of moving specimens, which comprises the following steps: step of acquiring lateral resolution: determining a lateral resolution according to the topography of a testing specimen; step of acquiring sampling frequency: determining a sampling frequency according to the moving speed of the testing specimen, the measuring speed of a measuring module and the lateral resolution; step of initiating a measurement process: start measuring the testing specimen according to the sampling frequency; and step of making an evaluation for determining whether the topography or thickness of the testing specimen can be obtained from the measurement process: if the evaluation determines that the topography or thickness can be obtained, integrating information including the sampling frequency, the moving speed of the testing specimen, the measuring speed of the measuring module and a signal relating to the position of the measuring module for obtaining the topography and/or thickness of the testing specimen, and thereafter, ending the measurement process.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 13, combining

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
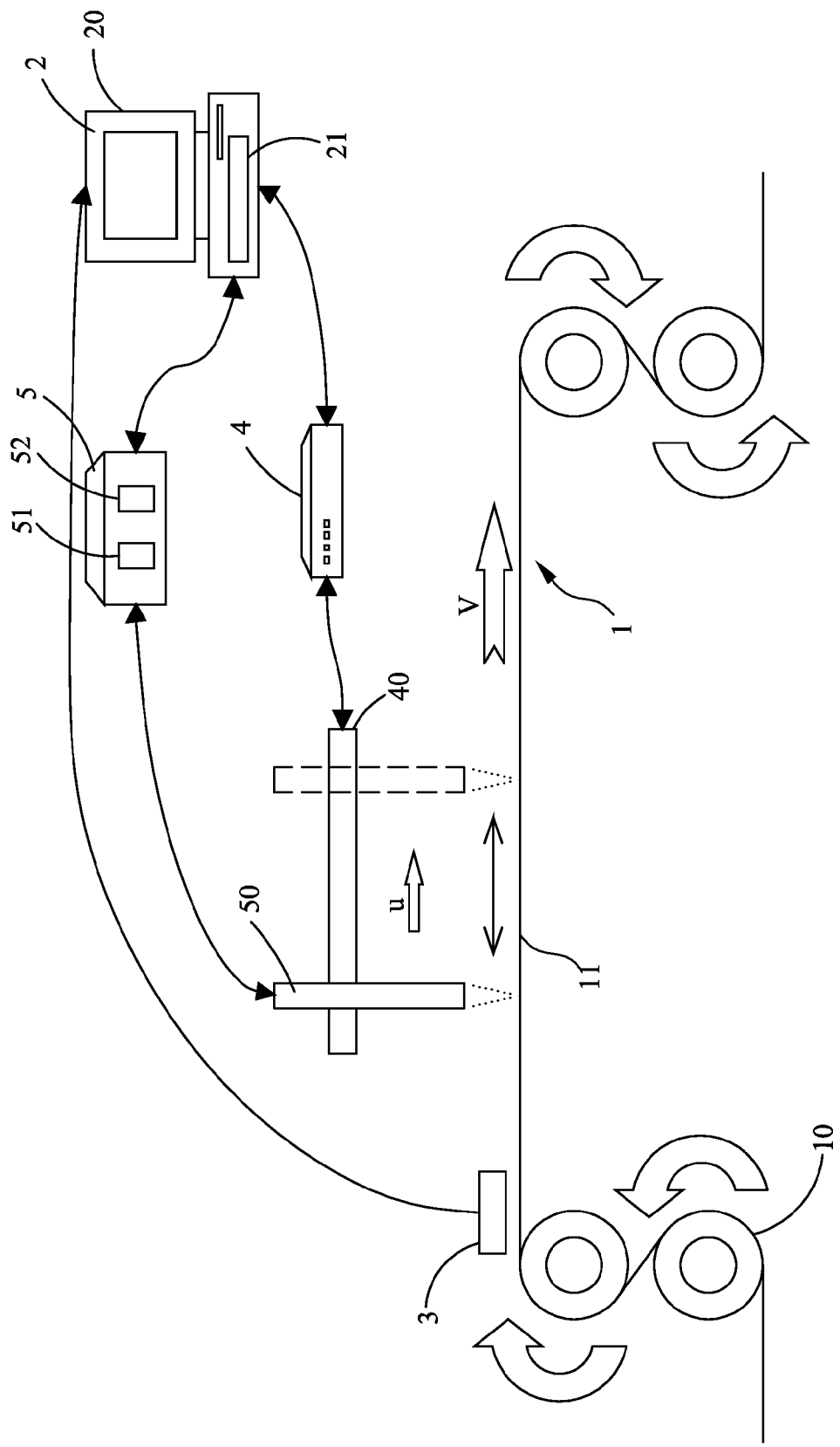
FIG. 1 is a schematic diagram showing an apparatus for measuring the topography of moving specimens according to a first embodiment of the present disclosure.

Please refer to FIG. 1, which is a schematic diagram showing an apparatus for measuring the topography of moving specimens according to a first embodiment of the present disclosure. The measuring apparatus in this embodiment is adapted to be applied to a transportation system 1 that can be a system composed of a specimen 11 in a roll-to-roll formation and a plurality of rollers 10 configured for unrolling and thus driving the specimen 11 to move.

In this embodiment, the measuring apparatus comprises: a control unit 2, at least one speed monitoring unit 3, a control module of linear movement 4, at least one first linear movement device 40, a first measurement control module 5 and at least one first measuring module 50.

The control unit 2 has a calculation unit 21 and a display unit 20, in which the calculation unit 21 is used for controlling the speed monitoring unit 3, the control module of linear movement 4 and the first measurement control module 5, and also for calculating the moving speed of testing specimen, the measuring speed of measuring module, and the topography and/or thickness of testing specimen; and the display unit 20 is provided for displaying the control and calculation results of the calculation unit 21.

Moreover, the speed monitoring unit 3 is electrically connected to the control unit 2 while being disposed at a position corresponding to the transportation system 1.

The control module of linear movement 4 and the first measurement control module 5 are electrically connected to the control unit 2 in respective, in which the first measurement control module 5 is configured with a spectrum analysis module 51 and a measurement control unit 52 in a manner that the spectrum analysis 51 is electrically connected to the measurement control unit 52, while the measurement control unit 52 is electrically connected to the control unit 2.

Each of the first linear movement devices 40 is disposed above the transportation system 1, while being electrically connected to the control module of linear movement 4. Moreover, each of the first measuring modules 50 is mounted on its corresponding first linear movement device 40 while being optically connected to the first measurement control module 5 for optical transmission. It is noted that each measuring module 50 is substantially an optical device selected from the group consisting of: a position sensor based upon chromatic confocal principle, position sensor based upon other principles, a laser triangulation position sensor, and an optical fiber position sensor using laser interference, and any of the aforesaid position sensor can be a position sensor with point-like focal spot or position sensor with linear focal spot.

Figure 2:
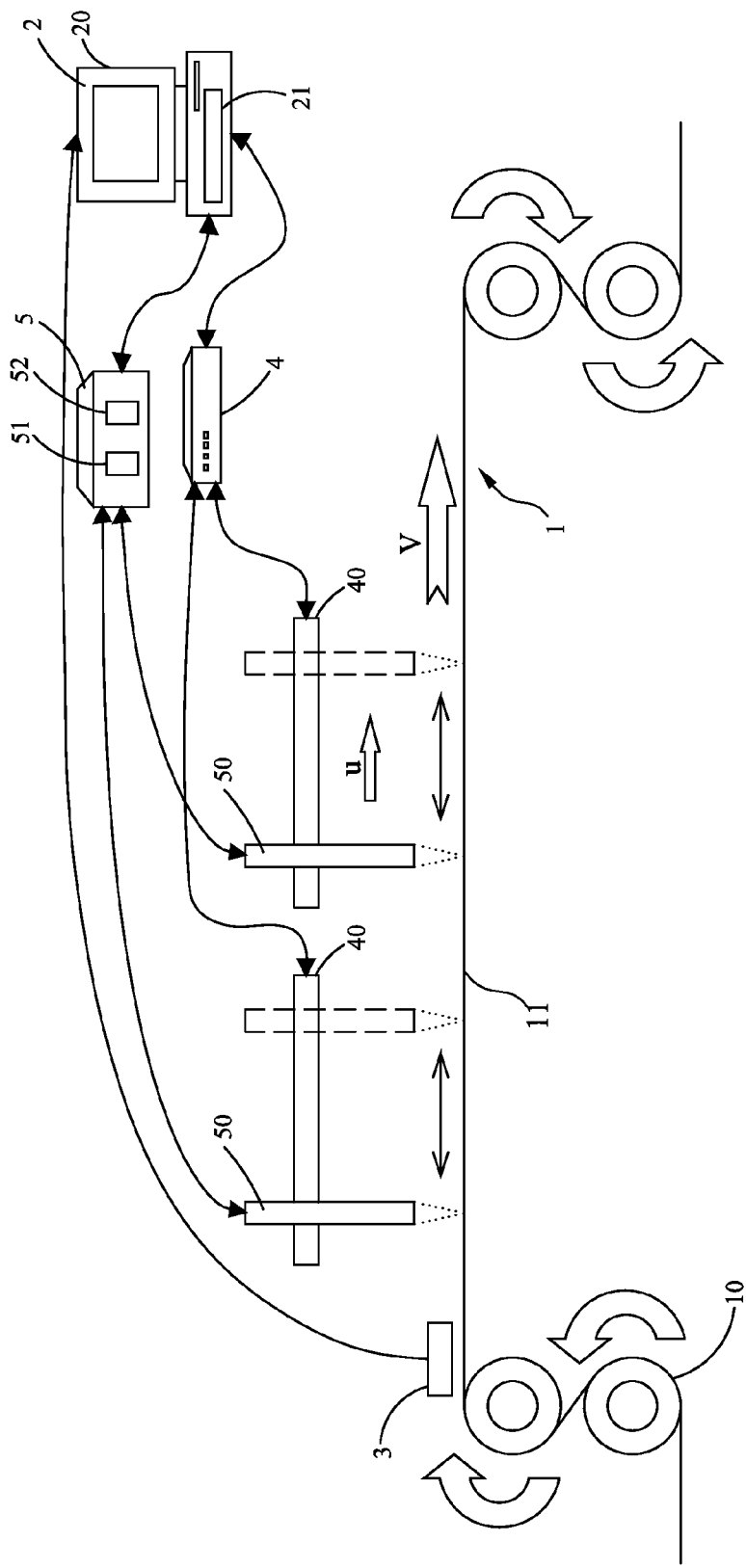
FIG. 2 is a schematic diagram showing an apparatus for measuring the topography of moving specimens according to a second embodiment of the present disclosure.

Please refer to FIG. 2, which is a schematic diagram showing an apparatus for measuring the topography of moving specimens according to a second embodiment of the present disclosure. In this embodiment, there are more than one first linear movement devices 40 being configured in the measuring apparatus and also there are more than one first measuring modules 50 as well, but other than that, all the other portions in the measuring apparatus remain the same as the one disclosed in the first embodiment. Thus, all the other components originally existed in the first embodiment remain unchanged in numbering.

As shown in FIG. 2, the plural first linear movement devices 40 are disposed above the transportation system 1, and each of the plural first measuring modules 50 is mounted on its corresponding first linear movement device 40.

Figure 3:
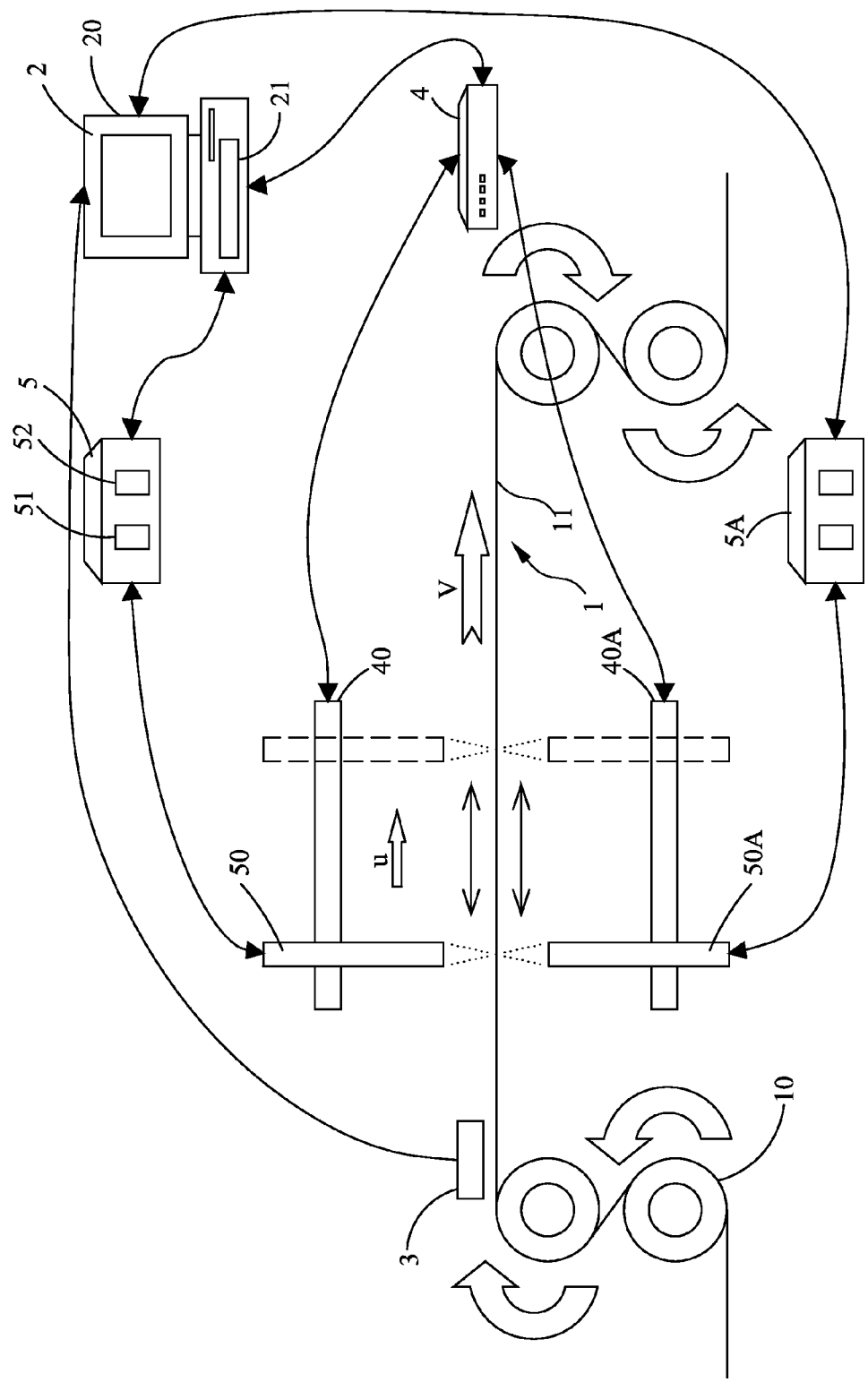
FIG. 3 is a schematic diagram showing an apparatus for measuring the topography of moving specimens according to a third embodiment of the present disclosure.

Please refer to FIG. 3, which is a schematic diagram showing an apparatus for measuring the topography of moving specimens according to a third embodiment of the present disclosure. In this embodiment, in addition to those components originally existed in the first embodiment, there are at least one second measuring module 50A, one second measurement control module 5A, and at least one second linear movement device 40A being added and configured in the measuring apparatus of the present disclosure in a manner that are similar to the configuration of the first measuring module 50, the first measurement control module 5 and the first linear movement device 40, but are different only in their disposition positions. Thus, no addition description relating to the configuration of the aforesaid additional component will be provided hereinafter, and all the other components originally existed in the first embodiment remain unchanged in numbering.

As shown in FIG. 3, each the second linear movement devices 40A is disposed under the transportation system 1 at a position corresponding to its corresponding first linear movement device 40. Moreover, each of the second measuring modules 50A is mounted on its corresponding second linear movement device 40A while being optically connected to the second measurement control module 5A for optical transmission.

Figure 4:
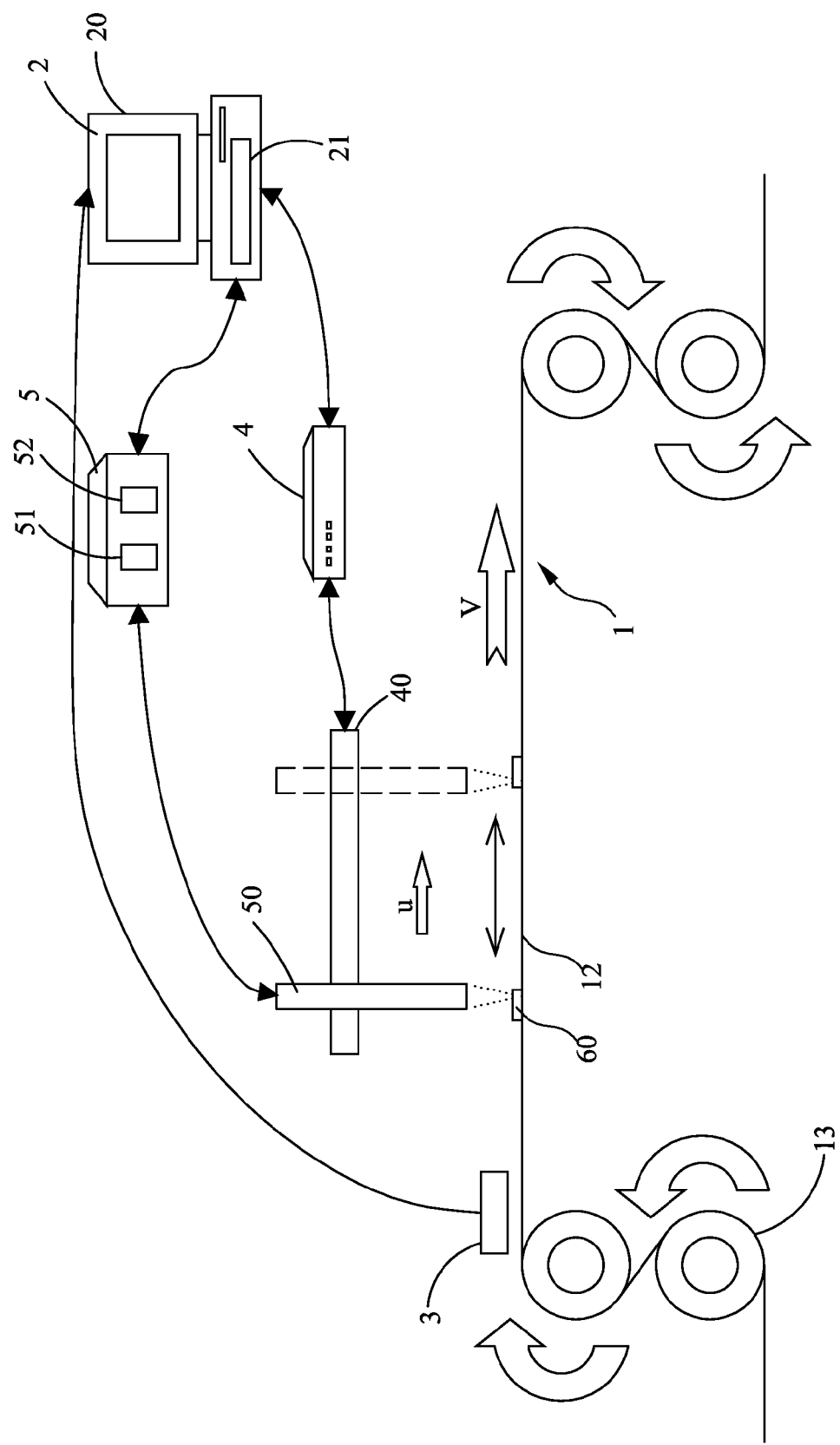
FIG. 4 is a schematic diagram showing an apparatus for measuring the topography of moving specimens according to a fourth embodiment of the present disclosure.
Figure 5:
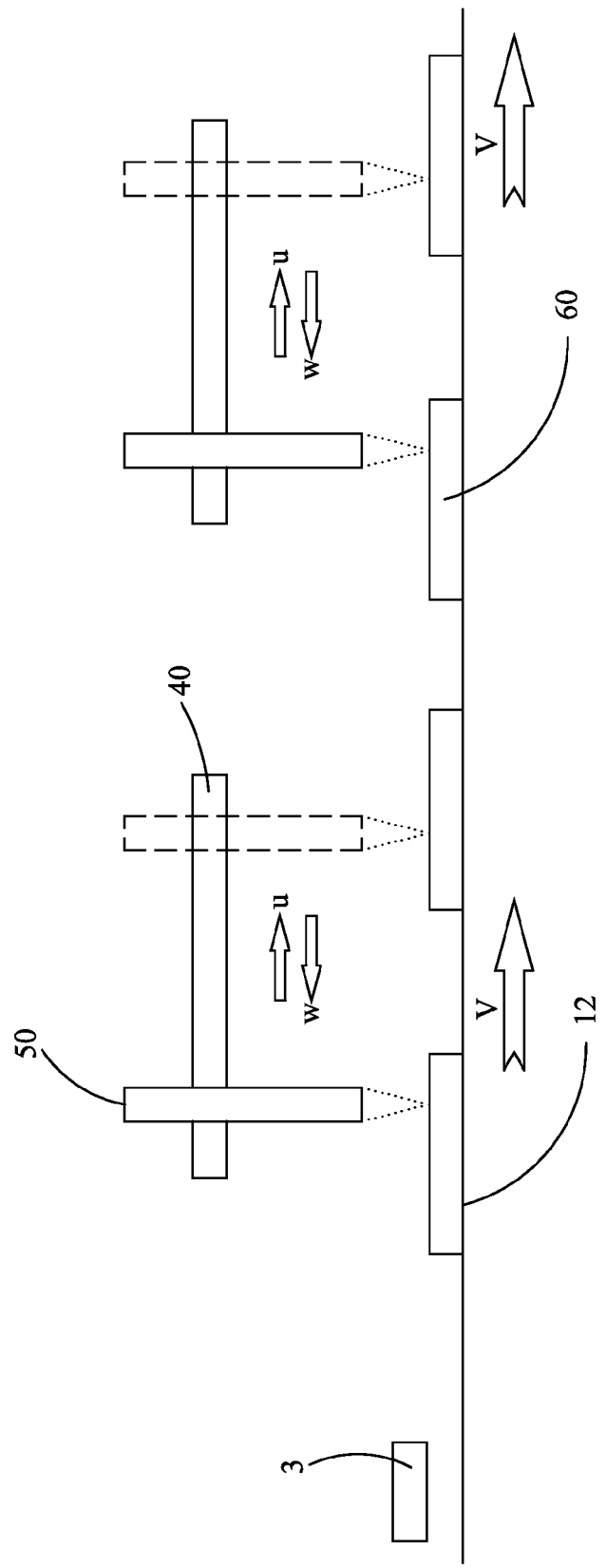
FIG. 5 is a schematic diagram showing an apparatus for measuring the topography of moving specimens according to a fifth embodiment of the present disclosure.
Figure 6:
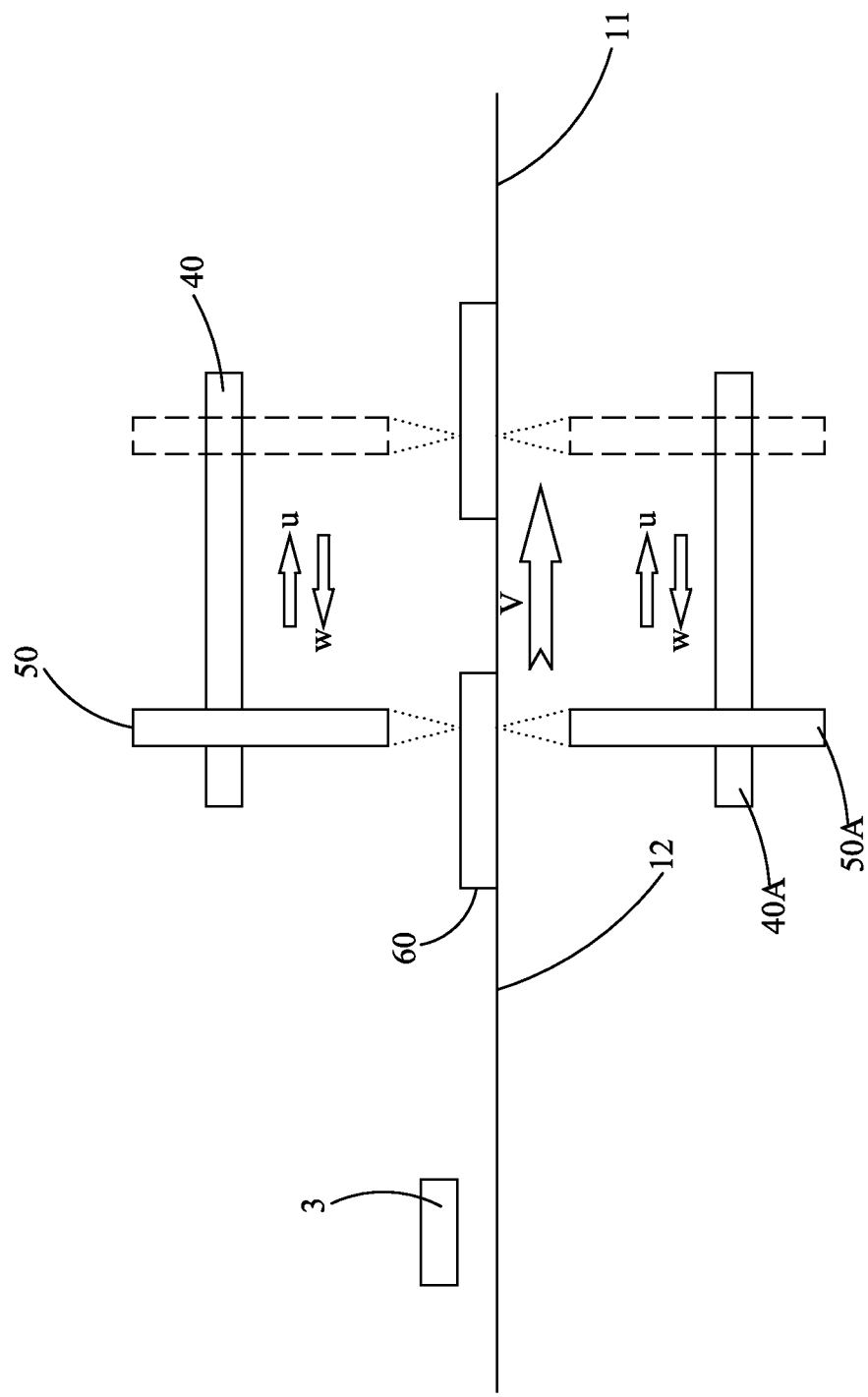
FIG. 6 is a schematic diagram showing an apparatus for measuring the topography of moving specimens according to a sixth embodiment of the present disclosure.

Please refer to FIG. 4, FIG. 5 and FIG. 6, which are respectively a fourth embodiment, a fifth embodiment and a sixth embodiment of the present disclosure. As shown in these three embodiments, the transportation system 1 is a system composed of a conveyance belt 12 and a plurality of rollers 13 configured for driving the conveyance belt 12 to move, but other than that, all the other components remain the same as those disclosed in the previous embodiments, and thus all the other components originally existed in the first embodiment remain unchanged in numbering.

Figure 7:
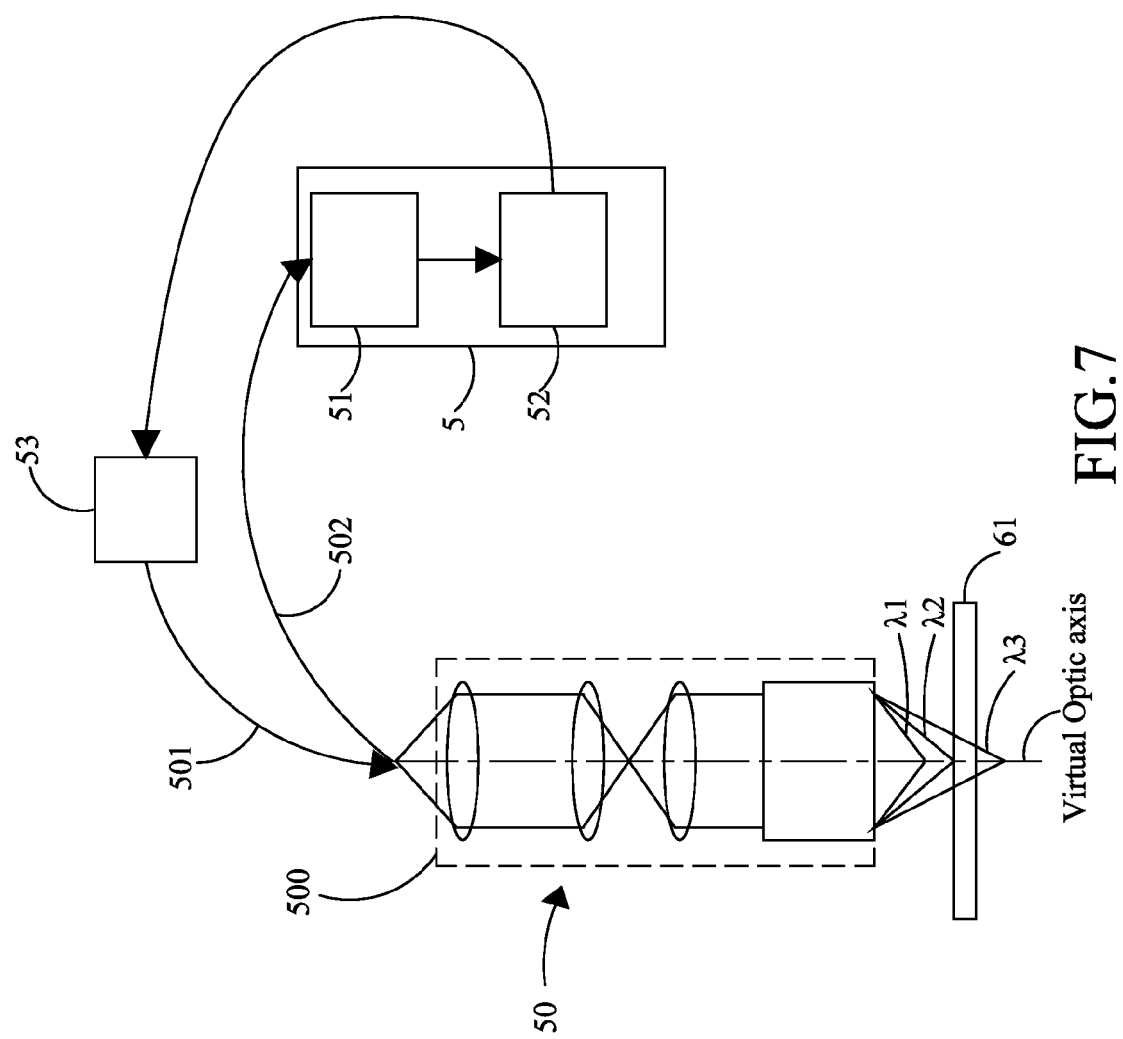
FIG. 7 is a schematic diagram showing a measuring module used in the present disclosure, which is substantially a chromatic confocal position sensor.

Please refer to FIG. 7, which is a schematic diagram showing a measuring module used in the present disclosure, which is substantially a chromatic confocal position sensor. In the embodiment shown in FIG. 7, both of the first measuring module 50 and the second measuring module 50A are chromatic confocal position sensor. Although the measuring modules as well as the measurement control module used in this embodiment are named differently and distinguished from each other into the first group and the second group of the measuring modules and also the measurement control modules as well, the two groups of the measuring modules and measurement control modules are basically the same in configuration and in operation principle, but only are different in their disposition positions. Thus, the following description will only address the first measuring module 50 and the first measurement control module 5 for illustration.

The first measurement control module 5 is further selectively comprised of a light source 53, that is electrically connected to the measurement control unit 52. It is noted that the light source 53 can be a light emitting diode, a halogen light, a laser source, or other light-emitting devices.

The first measuring module 50 is further comprised of: a lens set 500, a light source cable 501 and a signal cable 502, in which the signal cable 502 is connected to the lens set 500 and the spectrum analysis module 51, and the light source cable 501 is connected to the lens set 500 and the light source 53.

In addition, the light source is used for emitting a multi-wavelength beam to the lens set 500 through the guiding of the light source cable 501. Thereafter, by the operation of the lens set 500, the waves of different wavelengths in the multi-wavelength beam, i.e. $\lambda_1, \lambda_2, \lambda_3, \ldots, \lambda_n$, are focused on a virtual optical axis in respective and then being projected onto a testing specimen 61 where they are reflected back to the lens set 500 so as to be further focused to their respective focal positions on the signal cable 502. Thereafter, the reflected beams are guided through a space filter for focusing those to a focal point so as to be fed to the spectrum analysis module 51. Then, by enabling the measuring module 50 to move relative to the testing specimen 61, the analyses of the spectrum analysis module 51 relating to different distance between the measuring module 50 and the testing specimen 61 are sent to the calculation unit 21 to be used in a calculation for obtaining position information on the virtual optic axis relating to the topography of the testing specimen 61, that combining with the information relating to the signals reflected respectively from the top and the bottom surfaces of the testing specimen 61 and the reflective index of the specimen 61, the thickness of the testing specimen can be obtained.

Figure 9:
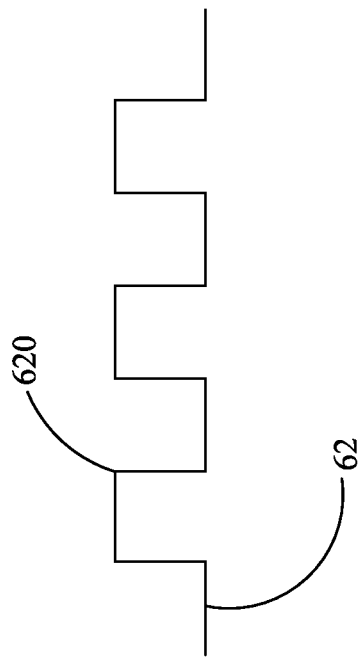
FIG. 9 is a schematic diagram showing a line profile obtained using the measuring module of FIG. 8.
Figure 8:
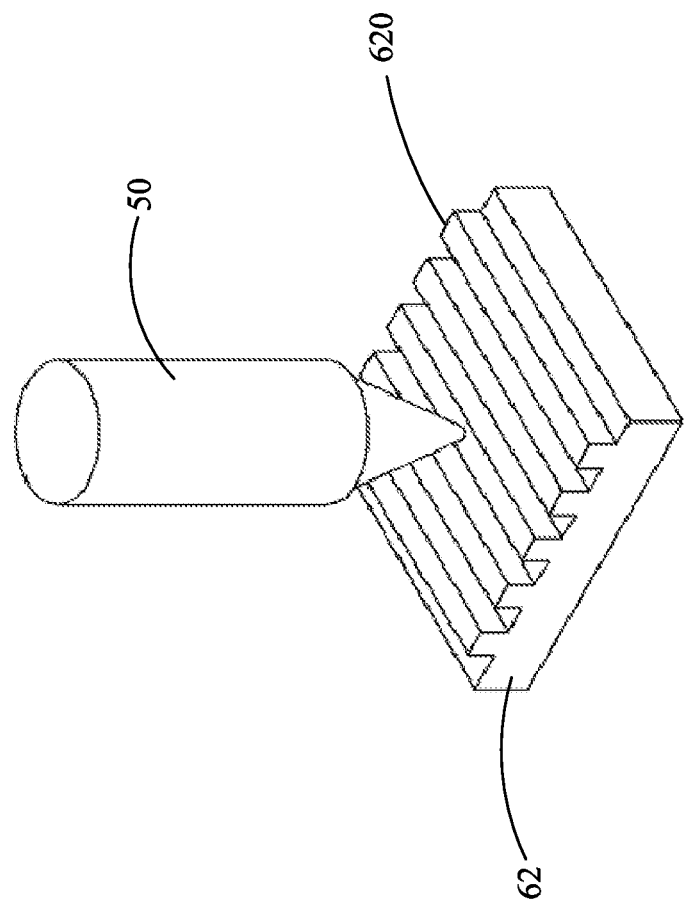
FIG. 8 is a schematic diagram showing the use of a measuring module for measuring a testing specimen in the present disclosure, whereas the measuring module is substantially a position sensor with point-like focal spot.

Please refer to FIG. 8 and FIG. 9, which are a schematic diagram showing the use of a measuring module for measuring a testing specimen in the present disclosure, whereas the measuring module is substantially a position sensor with point-like focal spot, and a schematic diagram showing a line profile obtained using the measuring module of FIG. 8. In FIG. 8, the first measuring module 50 is a position sensor with point-like focal spot that is used for measuring a specimen 61 with undulating surface 620. By projecting the point-like focal spot emitted from the first measuring module 50 onto the specimen 61, the reflection of the point-like focal spot containing the surface information of the specimen 61 will be gathered and analyzed by the spectrum analysis module 51, the measurement control module 52, the control module of linear movement 4 and the control unit 2 so as to obtain the topography of the specimen 61, as the linear profile shown in FIG. 9.

Figure 11:
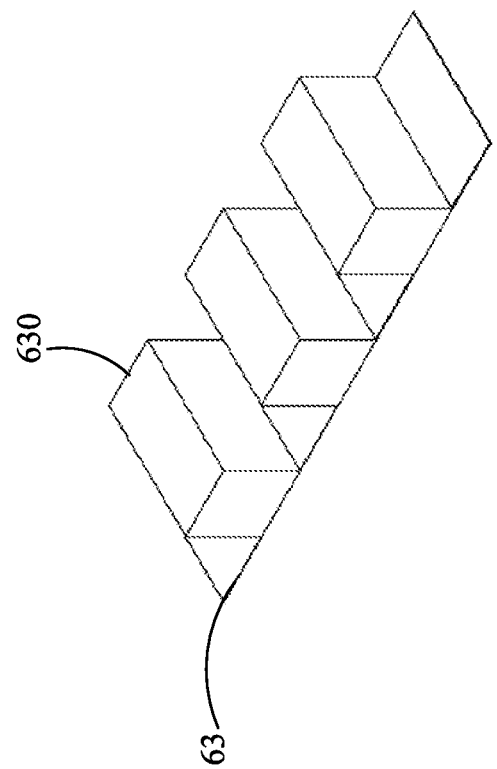
FIG. 11 is a schematic diagram showing a three-dimensional profile obtained using the measuring module of FIG. 10.
Figure 10:
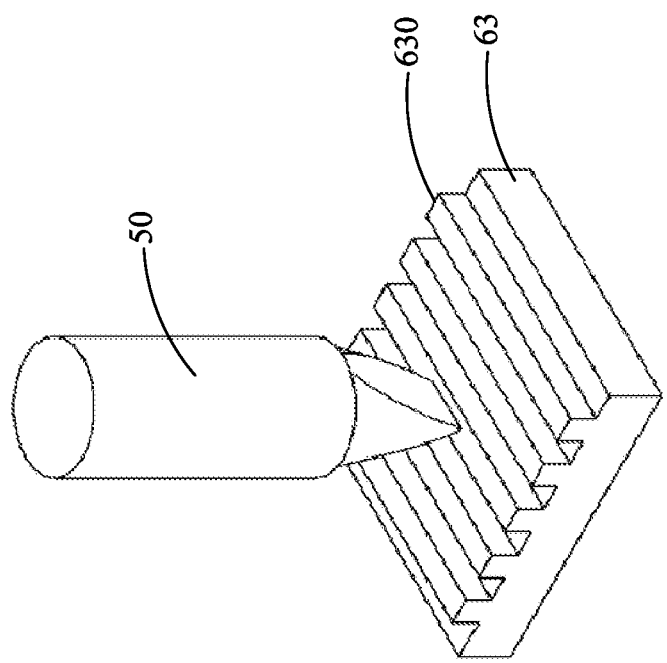
FIG. 10 is a schematic diagram showing the use of a measuring module for measuring a testing specimen in the present disclosure, whereas the measuring module is substantially a position sensor with linear focal spot.

Please refer to FIG. 10 and FIG. 11, which are a schematic diagram showing the use of a measuring module for measuring a testing specimen in the present disclosure, whereas the measuring module is substantially a position sensor with liner focal spot, and a schematic diagram showing a three-dimensional profile obtained using the measuring module of FIG. 10. In FIG. 10, the first measuring module 50 is a position sensor with linear focal spot that is used for measuring a specimen 63 with undulating surface 630. By projecting the linear focal spot emitted from the first measuring module 50 onto the specimen 63, the reflection of the linear focal spot containing the surface information of the specimen 63 will be gathered and analyzed by the spectrum analysis module 51, the measurement control module 52, the control module of linear movement 4 and the control unit 2 so as to obtain the topography of the specimen 63, as the three-dimensional profile shown in FIG. 11.

Referring back to the second and the fifth embodiments shown in FIG. 2 and FIG. 5, the two continuous manufacturing processes are implemented using a plurality of the first measuring modules 50 for measuring either a specimen 11 in a roll-to-roll formation or a plurality of testing specimens 60 being arranged to be measured one after another.

Figure 12:
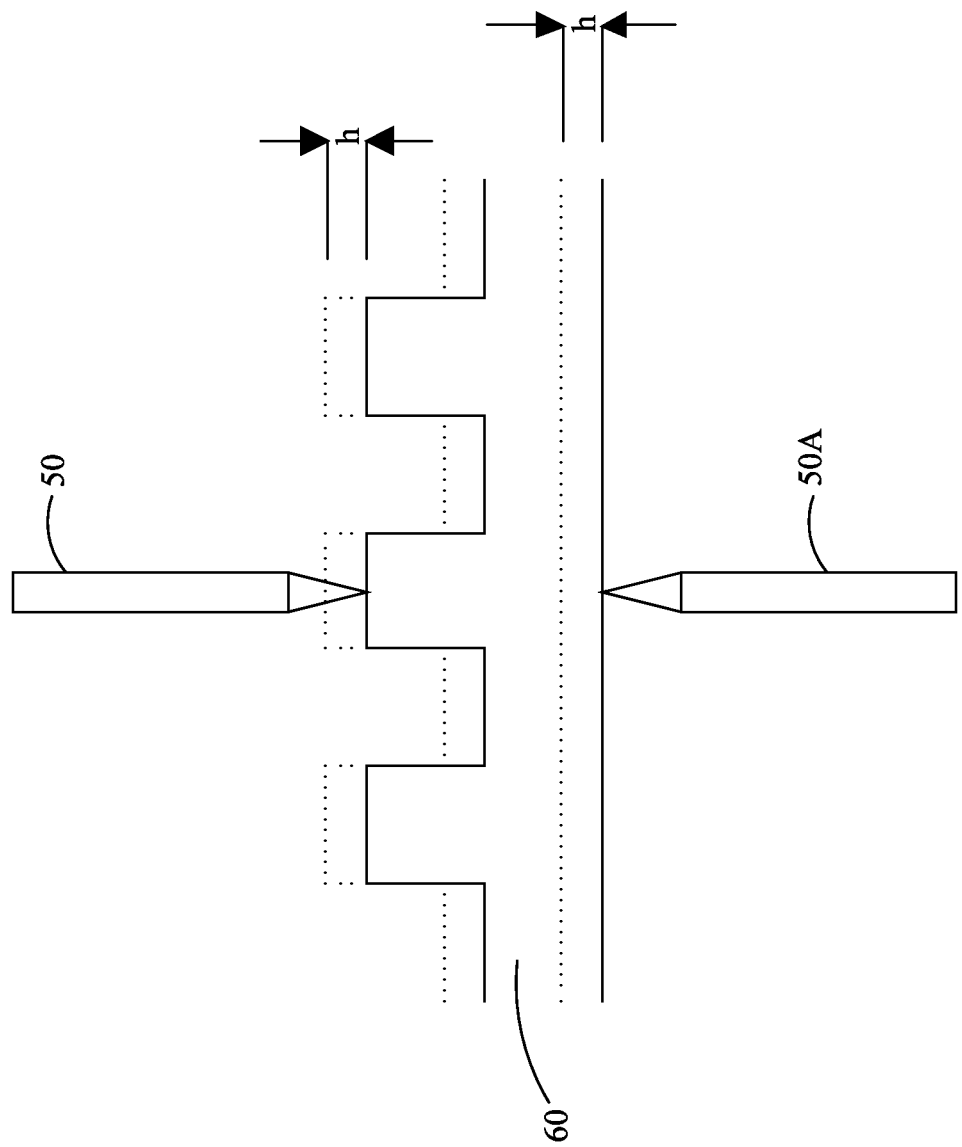
FIG. 12 is a schematic diagram showing the vibrating magnitudes of a specimen obtained using the measuring modules of the present disclosure.

Referring back to the third and the sixth embodiments shown in FIG. 3 and FIG. 6, there are vibrations happened during the measuring of the specimen 11 in a roll-to-roll formation or the plural testing specimens 60 being arranged to be measured one after another. It is noted that such vibrations might be originated from ambient environment or can be originated from the specimen itself. Please refer to FIG. 12, which is a schematic diagram showing the vibrating magnitudes of a specimen obtained using the measuring modules of the present disclosure. As shown in FIG. 12, the first measuring module 50 disposed above the specimen 60 detects a vibrating magnitude h while simultaneously the second measuring module 50A disposed under the specimen 60 also detects a vibrating magnitude h, thereafter, the two vibrating magnitudes h are sent to the control unit 2 for controlling the calculation unit 21 to perform a calculation accordingly while displaying the calculation result on the display unit 20. Accordingly, the measured vibrating magnitude can be subtracted from the topography and/or thickness of the testing specimen for preventing error, and thus a true topography and/or thickness of the testing specimen can be obtained.

It is noted that the embodiments shown in FIG. 1, FIG. 2 and FIG. 3 are designed for measuring a specimen 11 in a roll-to-roll formation, and the embodiments shown in FIG. 4, FIG. 5 and FIG. 6 are designed for measuring a plurality of testing specimens 60 being carried on a conveyance belt 12 so as to be measured one after another. Among which, the methods of measuring used in FIG. 1 and FIG. 4 are the same, the methods of measuring used in FIG. 2 and FIG. 5 are the same, and the methods of measuring used in FIG. 3 and FIG. 6 are the same. Thus, for simplicity, the following description will only be provided according to FIG. 4 to FIG. 6 for illustration. The difference between the embodiment shown in FIG. 5 and FIG. 6 is that: there are only the type of first measuring modules 50 and the type of first linear movement device 40 being used in the embodiment of FIG. 5, but there are both the first and the second measuring modules 50, 50A and also the first and the second linear movement devices 40, 40A as well being used in the embodiment of FIG. 6.

Figure 13A:
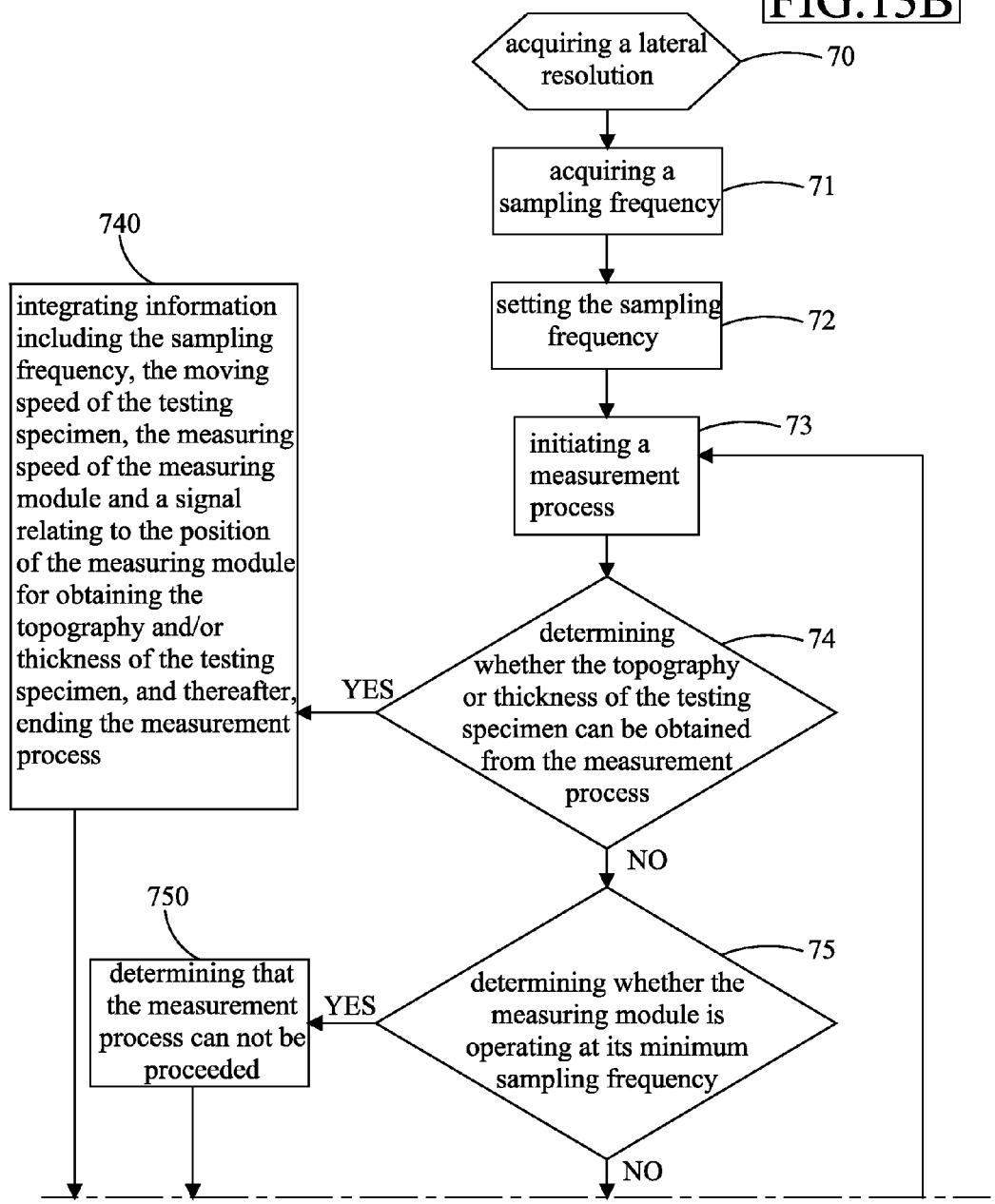
FIG. 13A and FIG. 13B, is a flow chart depicting the steps of a method for measuring the topography of moving specimens according to an embodiment of the present disclosure.
Figure 13B:
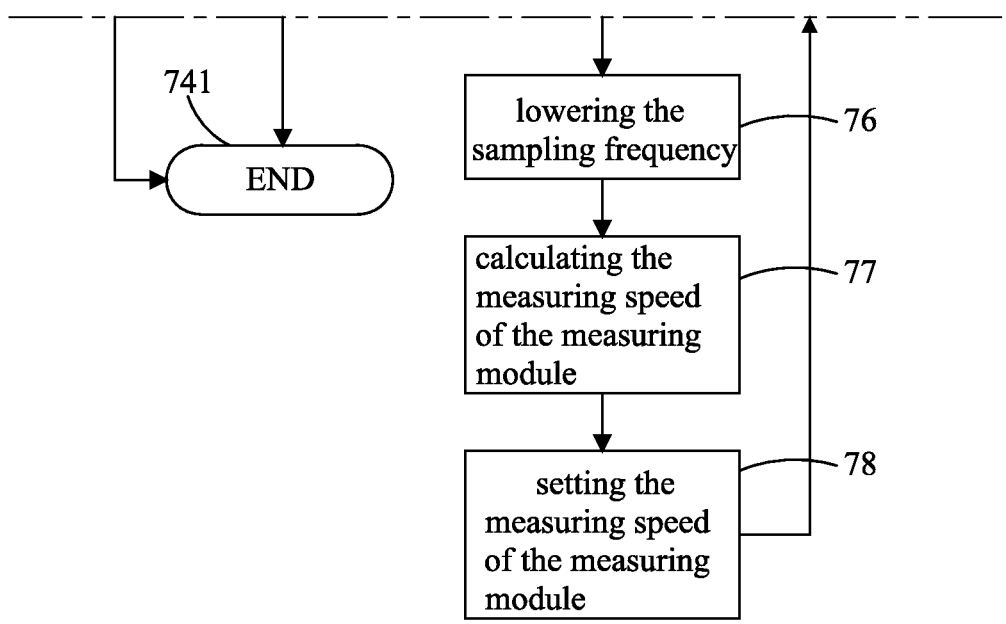
Figure 14:
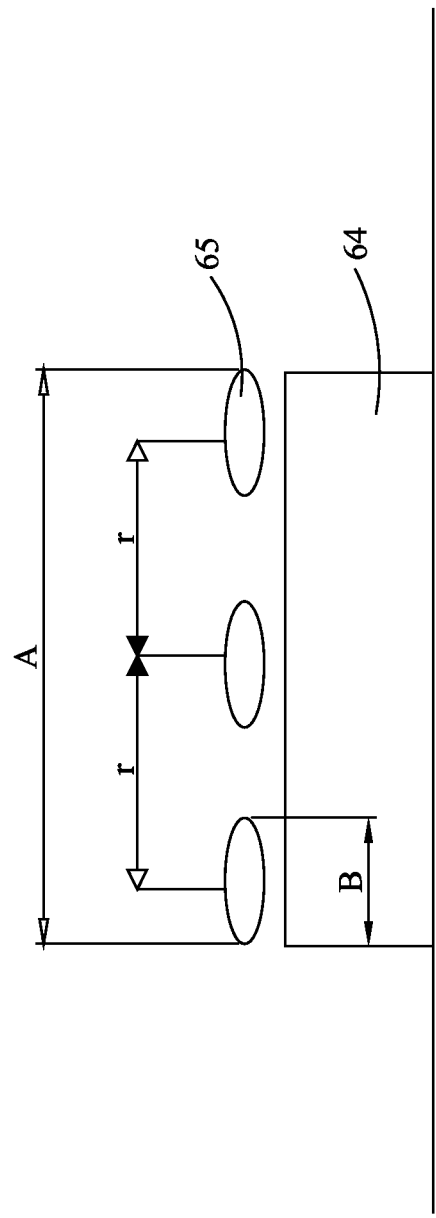
FIG. 14 is a schematic diagram how the lateral resolution is obtained in the present disclosure.

Please refer to FIG. 13, which is the combination of FIG. 13A and FIG. 13B for depicting the steps of a method for measuring the topography of moving specimens according to an embodiment of the present disclosure. The measuring method in this embodiment is adapted to be applied to a transportation system that can be a system composed of a specimen 11 in a roll-to-roll formation and a plurality of rollers 10 configured for unrolling and thus driving the specimen 11 to move or a system composed of a conveyance belt 12 and a plurality of testing specimens 60 being carried on a conveyance belt 12 so as to be measured one after another while the conveyance belt 12 is being driven to move by a plurality of rollers 13. The method for measuring the topography of moving specimens comprises the following steps:

Step of acquiring lateral resolution 70 (the lateral resolution will be referred as r in short hereinafter):
Please refer to FIG. 14, which is a schematic diagram how the lateral resolution is obtained in the present disclosure. In this embodiment, the specimen can be stationary or moving, and also the specimen determining a lateral resolution according to the topography of a testing specimen is formed as a platform having a topography 64 with at least one island protruding thereon while the specimen can be made of a transparent material or an opaque material.

In the step for acquiring the lateral resolution, at least two light signals 65 are required and used, and thus the measuring module will have to project at least two light signals 65 onto the topography 64, whereas each of the light signals can be a point-like focal spot or a linear focal spot. In a condition when a point-like focal spot with a diameter B or a linear focal spot with a width B is used, a minimum lateral resolution can be obtained according to the following formula:

$$r = (A-B)/2.$$

In a condition when no island protruding on the topography, but the topography is a surface selected from the group consisting of: an undulating surface, a flat surface, and the combination of the two, the lateral resolution can be determined according to the judgment of a person performing the measurement.

Step of acquiring sampling frequency 71 (the sampling frequency will be referred as f in short hereinafter):
Referring to FIG. 4, in a condition when there are a plurality of the testing specimens 60 being arranged to be measured one after another while each being driven to move in a moving speed v, that can be detected by at least one speed monitoring unit 3 and then transmitted to a calculation unit 21 of a control unit 2, according to the calculation of the calculation unit 21 that the control unit 2 will issue a signal to the control module of linear movement 4 for controlling at least one linear movement device to drive the corresponding at least one measuring module to move in a measuring speed u. Consequently, a sampling frequency f can be defined as f=v−u/r, i.e. u=v−f*r.

Moreover, in a condition when the testing specimen has a data composed of patterns or symbols that is formed on the surface thereof, the data is accessed using at least one speed monitoring unit where it is identified for obtain the moving speed v of the testing specimen, and then the moving speed is fed to a calculation unit 21 configured in a control unit 2 to be used in a calculation for obtaining a measuring speed u, and then, a driving step is performed for enabling at least one measuring module to be driven by at least one linear movement device to move in the measuring speed relative to the testing specimen. On the other hand, the moving speed v of the testing specimen can be obtained based upon the surface linear speed of the at least one roller 10 that is used for driving the specimen to move, in that the surface linear speed v of the roller 10 is obtained by the use of a speed monitoring unit 3 which monitors a sign marked on the roller that appears and disappear during the rotation of the roller 10.

Step of setting the sampling frequency 72: according to the step 71, the sampling frequency f obtained from the sampling frequency acquisition step is set to be the sampling frequency f of the measuring module.

Step of initiating a measurement process 73: start measuring the testing specimen 60 according to the sampling frequency f obtained from the step of acquiring sampling frequency 71.

Step of making an evaluation for determining whether the topography or thickness of the testing specimen can be obtained from the measurement process 74: if the evaluation determines that the topography or thickness can be obtained, a step 740 for integrating information including the sampling frequency f, the moving speed v of the testing specimen, the measuring speed u of the measuring module and a signal relating to the position of the measuring module for obtaining the topography and/or thickness of the testing specimen 60 is performed, and thereafter, the flow proceeds to a step for ending the measurement process 741. However, if the evaluation determines that the topography or thickness can not be obtained, the flow will proceeds to step for determining whether the measuring module is operating at its minimum sampling frequency $f_o$ 60.

In addition, in a condition when there are vibrations happened during the measuring of the specimen 60, the vibrating magnitude h of the specimen is measured by at least two measuring modules, as shown in FIG. 12, and then the measured vibrating magnitude h is subtracted from the topography and/or thickness of the testing specimen 60 obtained from the step 740 so as to obtain a true topography and/or thickness of the testing specimen 60.

Step for determining whether the measuring module is operating at its minimum sampling frequency $f_0$ 60: If so, the process is situated in a condition that: $f=f_0$, and thus the flow will proceeds to step 750 where a determination is made that the measurement process can not be proceeded further and thus enables the flow to step 741 for ending the process; Otherwise, the process is situated in a condition that $f>f_0$, and thus the flow will proceeds to step 76. It is noted that the minimum sampling frequency $f_0$ is a constant frequency defining the sampling range of the measuring module, i.e. when any measuring module will not be able to perform the measurement process using a frequency lower than the minimum sampling frequency $f_0$.

Step of lowering the sampling frequency 76 (the so-lowered sampling frequency will be referred as $f_1$ in short hereinafter): the original sampling frequency f is lowered to the sampling frequency $f_1$ while using the lowered sampling frequency $f_1$ to replace the original sampling frequency f to be used as the new sampling frequency of the measuring module;

Step for calculating the measuring speed of the measuring module 77: As the sampling frequency of the measuring module is change from f to $f_1$, thus the measuring speed u should be changed according to the formula: $u=v-f_1*r$.

Step for setting the measuring speed of the measuring module 78: changing the measuring speed of the measuring module to the measuring speed u obtained in the step 76 according to the formula: $u=v-f_1*r$; and then proceeding back to step 73 until the evaluation in step 74 determines that the topography or thickness of the testing specimen can be obtained.

Figure 15:
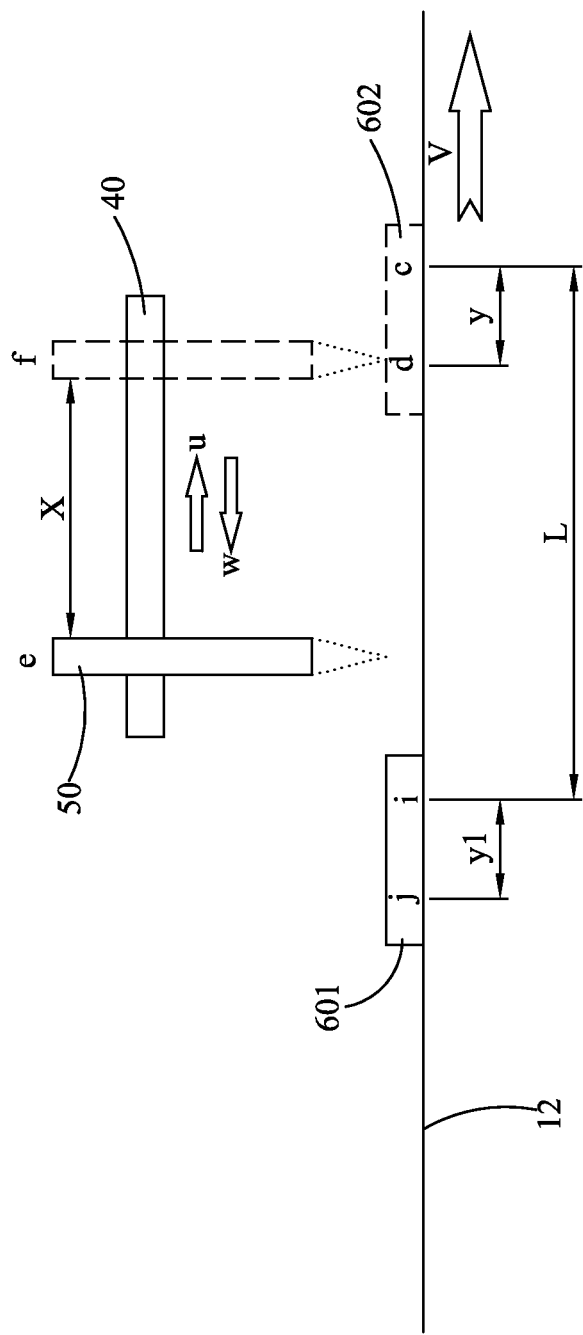
FIG. 15 is a schematic diagram showing how the measuring module of the present disclosure can be adapted for measuring a plurality of testing specimens being arranged one after another.

Please refer to FIG. 15, which is a schematic diagram showing how the measuring module of the present disclosure can be adapted for measuring a plurality of testing specimens being arranged one after another. In a condition when there are a plurality of the testing specimens being arranged to be measured one after another, such as the specimen 602 that is arranged in front of the specimen 601 so as to be measured first, any two neighboring testing specimens, such as the specimens 602 and 601, are separated from each other by a specimen interval L, and the measuring module will be driven to move in the measuring speed u along with the moving of the testing specimen 602 by a measurement distance x. After the measuring of the testing specimen 602 is completed, the measuring module is moved backward to another testing specimen 601 in a backward moving speed w; and consequently, as any two neighboring testing specimens, such as the specimens 601 and 602 shown in FIG. 15, are separated from each other by the specimen interval L, whereas the testing specimen 601 is configured with two measure points i and j that are separated by a specific interval $y_1$ and the testing specimen 602 is configured with two measure points c and d that are separated by a specific interval y, and $y=y_1$, it is concluded that $w=xv/(L-x-y)$, in which v is the moving speed of the specimens 601, 602 when they are being carried to move by the conveyance belt 12. That is, during the measuring module 50 is moved from the location e to the location f in a measuring speed u and in a measurement distance x, the measuring module 50 is able to scan and measure the specimen 602 within the area between the measure point c and d as the specimen 602 is moving in a moving speed, and consequently the measure point i of the specimen 601 can be aligned exactly with the measuring module 50 when it is move back to the location e in a condition that the measuring module is enabled to move backward to the location e in a backward moving speed w, i.e. $w=xv/(L-x-y)$.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An apparatus for measuring the topography of moving specimens, adapted to be applied to a transportation system, comprising:
    a control unit;
    a control module of linear movement, electrically connecting to the control unit;
    at least one first linear movement device, each disposed above the transportation system while being electrically connected to the control module of linear movement;
    a first measurement control module, electrically connecting to the control unit; and
    at least one first measuring module, each being mounted at the corresponding first linear movement device while being enabled to optically connect to the first measurement control module for optical transmission,
    wherein the apparatus is configured to make an evaluation for determining whether the topography or thickness of a testing specimen can be obtained: if the evaluation determines that the topography or thickness can be obtained, integrating information including a sampling frequency, a moving speed of the testing specimen, a measuring speed of the first measuring module and a signal relating to the position of the first measuring module for obtaining the topography and/or thickness of the testing specimen.

2. The measuring apparatus of claim 1, wherein the transportation system is a system selected from the group consisting of: a system composed of a specimen in a roll-to-roll formation and a plurality of rollers configured for unrolling and thus driving the specimen to move, and a system composed of a conveyance belt and a plurality of rollers configured for driving the conveyance belt to move.

3. The measuring apparatus of claim 1, further comprising:
    a speed monitoring unit, electrically connected to the control unit.

4. The measuring apparatus of claim 1, further comprising:
    at least one second linear movement device, each disposed under the transportation system at a position opposite to its corresponding first linear movement device while being electrically connected to the control module of linear movement;
    a second measurement control module, electrically connecting to the control unit; and
    at least one second measuring module, each being mounted at the corresponding second linear movement device while being enabled to electrically connect to the second measurement control module.

5. The measuring apparatus of claim 4, wherein the first measuring module is an optical device selected from the group consisting of: a chromatic confocal position sensor, a laser triangulation position sensor, and an optical fiber position sensor using laser interference.

6. The measuring apparatus of claim 5, wherein the first measuring module is a device selected from the group consisting of: a position sensor with point-like focal spot, and a position sensor with linear focal spot.

7. The measuring apparatus of claim 1, wherein the first measurement control module is further comprised of:

a measurement control unit, electrically connected to the control unit; and a spectrum analysis module, electrically connected to the measurement control unit.

8. The measuring apparatus of claim 7, wherein the first measurement control module is further comprised of:

a light source, electrically connected to the measurement control unit; and the first measuring module is further comprised of:

a lens set;

a light source cable, connected to the lens set and the light source; and a signal cable, connected to the lens set and the spectrum analysis module.

9. The measuring apparatus of claim 1, wherein the control unit further comprises: a calculation unit and a display unit.

10. A method for measuring the topography of moving specimens, comprises the following steps:

step of acquiring lateral resolution: determining a lateral resolution according to the topography of a testing specimen;

step of acquiring sampling frequency: determining a sampling frequency according to the moving speed of the testing specimen, the measuring speed of a measuring module and the lateral resolution;

step of initiating a measurement process: start measuring the testing specimen according to the sampling frequency; and step of making an evaluation for determining whether the topography or thickness of the testing specimen can be obtained from the measurement process: if the evaluation determines that the topography or thickness can be obtained, integrating information including the sampling frequency, the moving speed of the testing specimen, the measuring speed of the measuring module and a signal relating to the position of the measuring module for obtaining the topography and/or thickness of the testing specimen, and thereafter, ending the measurement process.

11. The measuring method of claim 10, wherein the testing specimen is made of a transparent material or an opaque material.

12. The measuring method of claim 11, wherein the testing specimen is an object selected from the group consisting of: a specimen in a roll-to-roll formation, and at least one specimen being transported on a conveyance belt.

13. The measuring method of claim 10, wherein in a condition when the evaluation determines that the topography or thickness can not be obtained, the following procedure is proceeded:

determining whether the measuring module is operating at its minimum sampling frequency; and if the measuring module is determined to be operating at its minimum sampling frequency, ending the measurement process.

14. The measuring method of claim 13, wherein in a condition when the measuring module is not operating at its minimum sampling frequency, i.e. the measuring module is operating at a sampling frequency larger than its minimum sampling frequency, the following procedures are proceeded:

proceeding a procedure for lowering the sampling frequency: lowering the sampling frequency while using the lowered sampling frequency to replace the sampling frequency obtained from the sampling frequency acquisition step;

proceeding a procedure for calculating the measuring speed of the measuring module: replacing the measuring speed of the measuring module while using the calculated measuring speed to replace the original measuring speed, and then proceeding back to the step for initiating the measurement process and proceeding to the end of the measurement process where the information including the sampling frequency, the moving speed of the testing specimen, the measuring speed of the measuring module and a signal relating to the position of the measuring module are integrated for obtaining the topography and/or thickness of the testing specimen.

15. The measuring method of claim 14, wherein in a condition when there are a plurality of the testing specimens being arranged to be measured one after another, while allowing any two neighboring testing specimens to be separated from each other by a specimen interval (L), the measuring module will be driven to move in the measuring speed along with the moving of one testing specimen by a measurement distance (x), and after the measuring of the referring testing specimen is completed, the measuring module is moved toward another testing specimen next to the referring testing specimen in a backward moving speed (w); and consequently, as any two neighboring testing specimens are separated from each other by the specimen interval (L), whereas each of the plural testing specimen that are driven to move in the moving speed (v), is configured with two measure points that are separated by a specific interval (y), it is concluded that w =xv/(L−x−y).

16. The measuring method of claim 15, wherein in a condition when the testing specimen is vibrating during the performing of the step for determining whether the topography or thickness of the testing specimen can be obtained from the measurement process, the vibrating magnitude of the specimen is measured by at least two measuring modules, and then the measured vibrating magnitude is subtracted from the topography and/or thickness of the testing specimen obtained from the step for integrating information including the sampling frequency, the moving speed of the testing specimen, the measuring speed of the measuring module and the measuring module signal so as to obtain a true topography and/or thickness of the testing specimen.

17. The measuring method of claim 16, wherein between the step for acquiring the sampling frequency and the step for initiating the measurement process, a step of setting the sampling frequency is performed, in which the sampling frequency obtained from the sampling frequency acquisition step is set to be the sampling frequency of the measuring module.

18. The measuring method of claim 17, wherein in the step for acquiring the lateral resolution, at least two light signals are required and used, using that the lateral resolution is defined as the result of the following calculation: subtracting the diameter or width of the light signal from the platform width of the specimen topography, and then dividing the result of the subtraction by two to be used as the lateral resolution.

19. The measuring method of claim 17, wherein the topography of the specimen has at least one platform thereon.

20. The measuring method of claim 18, wherein the light signal can be a signal selected from the group consisting of: a point-like focal spot and a linear focal spot.

21. The measuring method of claim 18, wherein in the step for acquiring sampling frequency, the sampling frequency is the result of the dividing of the moving speed of the testing specimen by the lateral resolution.

22. The measuring method of claim 21, wherein in the step for acquiring sampling frequency, the moving speed of the testing specimen is obtained using at least one speed monitoring unit, and thereafter, the moving speed is sent to a calculation unit configured in a control unit to be used in a calculation for obtaining a measuring speed, and then, a driving step is performed for enabling at least one measuring module to be driven by at least one linear movement device to move in the measuring speed relative to the testing specimen.

23. The measuring method of claim 21, wherein in the step for acquiring sampling frequency, when the testing specimen has a data composed of patterns or symbols that is formed on the surface thereof, the data is accessed using at least one speed monitoring unit where it is identified for obtain the moving speed of the testing specimen, and then the moving speed is fed to a calculation unit configured in a control unit to be used in a calculation for obtaining a measuring speed, and then, a driving step is performed for enabling at least one measuring module to be driven by at least one linear movement device to move in the measuring speed relative to the testing specimen.

24. The measuring method of claim 21, wherein in the step for acquiring sampling frequency, the surface linear speed of at least one roller is measured to be used as base for obtaining the moving speed of the testing specimen, and then the moving speed is fed to a calculation unit configured in a control unit to be used in a calculation for obtaining a measuring speed, and then, a driving step is performed for enabling at least one measuring module to be driven by at least one linear movement device to move in the measuring speed relative to the testing specimen.

25. The measuring method of claim 24, wherein the moving speed of the testing specimen is obtained based upon the surface linear speed of the roller while the surface linear speed is obtained by the use of a speed monitoring unit monitoring a sign marked on the roller that appears and disappear during the rotation of the roller.

26. The measuring method of claim 18, wherein in the step for acquiring lateral resolution, the testing specimen is a specimen formed with a surface selected from the group consisting of: an undulating surface, a flat surface, and the combination of the two.

* * * * *